United States Patent
Christmas et al.

(10) Patent No.: US 10,614,234 B2
(45) Date of Patent: *Apr. 7, 2020

(54) PAPERLESS APPLICATION

(71) Applicant: Fasetto, Inc., Superior, WI (US)

(72) Inventors: Coy Christmas, Superior, WI (US); Luke Malpass, Stoke-on-Trent (GB)

(73) Assignee: FASETTO, INC., Superior, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/114,531

(22) Filed: Aug. 28, 2018

(65) Prior Publication Data

US 2019/0012473 A1    Jan. 10, 2019

Related U.S. Application Data

(63) Continuation of application No. 14/709,231, filed on May 11, 2015, now Pat. No. 10,095,873, which is a
(Continued)

(51) Int. Cl.
*G06F 21/62* (2013.01)
*H04W 4/80* (2018.01)
(Continued)

(52) U.S. Cl.
CPC .............. *G06F 21/62* (2013.01); *G06F 16/10* (2019.01); *G06F 16/16* (2019.01);
(Continued)

(58) Field of Classification Search
CPC ...... G06F 21/62; G06F 16/16; G06F 16/9554; G06F 16/10; G06F 21/6272; G06Q 20/40;
(Continued)

(56) References Cited

U.S. PATENT DOCUMENTS 5,303,388 A    4/1994    Kreitman
5,664,228 A    9/1997    Mital
(Continued)

FOREIGN PATENT DOCUMENTS

AU    2013352236    11/2018
CN    103945003    7/2001
(Continued)

OTHER PUBLICATIONS

USPTO; Office Action dated Oct. 8, 2015 in U.S. Appl. No. 14/092,165.
(Continued)

*Primary Examiner* — Cheng-Feng Huang
(74) *Attorney, Agent, or Firm* — Snell & Wilmer, L.L.P.

(57) ABSTRACT

Systems, methods, and programs of processing and transmitting information between devices are disclosed. A receiving device may generate a key. A transmitting device may scan the key. The transmitting device may transmit information to a file management system in response to scanning the key. A user associated with the receiving device may indicate a location to store the information. The user may access the information from the file management system.

18 Claims, 7 Drawing Sheets

Related U.S. Application Data continuation-in-part of application No. 14/500,363, filed on Sep. 29, 2014, now abandoned.

(60) Provisional application No. 61/884,826, filed on Sep. 30, 2013.

(51) Int. Cl.

| | | |
|---|---|---|
| *G06F 16/10* | (2019.01) | |
| *G06F 16/955* | (2019.01) | |
| *H04L 29/08* | (2006.01) | |
| *H04W 12/08* | (2009.01) | |
| *G06Q 20/10* | (2012.01) | |
| *G06F 16/16* | (2019.01) | |
| *G06Q 20/40* | (2012.01) | |
| *G06Q 20/38* | (2012.01) | |
| *H04L 29/06* | (2006.01) | |
| *H04W 12/04* | (2009.01) | |
| *H04W 12/00* | (2009.01) | |

(52) U.S. Cl.
CPC ...... *G06F 16/9554* (2019.01); *G06F 21/6272* (2013.01); *G06Q 20/102* (2013.01); *G06Q 20/3829* (2013.01); *G06Q 20/40* (2013.01); *H04L 67/06* (2013.01); *H04W 4/80* (2018.02); *H04W 12/08* (2013.01); *H04L 63/0428* (2013.01); *H04L 63/061* (2013.01); *H04W 12/00522* (2019.01); *H04W 12/04* (2013.01)

(58) Field of Classification Search
CPC ... G06Q 20/3829; G06Q 20/102; H04W 4/80; H04W 12/08; H04W 12/00522; H04W 12/04; H04L 67/06; H04L 63/061; H04L 63/0428
See application file for complete search history.

(56) References Cited

U.S. PATENT DOCUMENTS

| | | | |
|---|---|---|---|
| 5,678,015 A | 10/1997 | Goh | |
| 5,689,287 A | 11/1997 | Mackinlay | |
| 5,689,654 A | 11/1997 | Kikinis et al. | |
| 5,729,471 A | 3/1998 | Jain | |
| 5,956,038 A | 9/1999 | Rekimoto | |
| 5,963,215 A | 10/1999 | Rosenzweig | |
| 5,982,295 A | 11/1999 | Goto et al. | |
| 6,002,403 A | 12/1999 | Sugiyama | |
| 6,008,809 A | 12/1999 | Brooks | |
| 6,029,183 A | 2/2000 | Jenkins | |
| 6,160,488 A | 12/2000 | Honda | |
| 6,489,932 B1 | 12/2002 | Chitturi | |
| 6,497,367 B2 | 12/2002 | Conzola et al. | |
| 6,581,068 B1 | 6/2003 | Bensoussan | |
| 6,597,358 B2 | 7/2003 | Miller | |
| 6,652,170 B1 | 11/2003 | Arnold | |
| 6,710,788 B1 | 3/2004 | Freach et al. | |
| 6,922,815 B2 | 7/2005 | Rosen | |
| 6,938,218 B1 | 8/2005 | Rosen | |
| 7,054,963 B2 | 5/2006 | Betts-LaCroix | |
| 7,134,095 B1 | 11/2006 | Smith | |
| 7,149,836 B2 | 12/2006 | Yu | |
| 7,216,305 B1 | 5/2007 | Jaeger | |
| 7,428,702 B1 | 9/2008 | Cervantes et al. | |
| 7,480,872 B1 | 1/2009 | Ubillos | |
| 7,516,484 B1 | 4/2009 | Arnouse | |
| 7,533,408 B1 | 5/2009 | Arnouse | |
| 7,725,839 B2 | 5/2010 | Michaels | |
| 7,761,813 B2 | 7/2010 | Kim | |
| D654,931 S | 2/2012 | Lemelman | |
| 8,111,255 B2 | 2/2012 | Park | |
| 8,117,563 B2 | 2/2012 | Ok | |
| 8,260,828 B2 | 9/2012 | Dijk et al. | |
| 8,264,488 B2 | 9/2012 | Ueno | |
| 8,386,686 B2 | 2/2013 | Lin | |
| 8,390,255 B1 | 3/2013 | Fathollahi | |
| 8,405,502 B2 | 3/2013 | Teague | |
| 8,483,758 B2 | 7/2013 | Huang | |
| 8,497,859 B1 | 7/2013 | Hickman et al. | |
| 8,510,680 B2 | 8/2013 | Kang | |
| 8,587,590 B2 | 11/2013 | Erickson et al. | |
| 8,614,885 B2 | 12/2013 | Solomon | |
| 8,699,218 B2 | 4/2014 | Xu | |
| 8,745,535 B2 | 6/2014 | Chaudhri | |
| 8,810,430 B2 | 8/2014 | Proud | |
| 8,924,862 B1 | 12/2014 | Luo | |
| 8,935,438 B1 | 1/2015 | Ivanchenko | |
| 9,047,050 B2 | 6/2015 | Medica | |
| 9,178,976 B2 | 11/2015 | Djordjevic | |
| 9,247,303 B2 | 1/2016 | Phang | |
| 9,288,295 B2 | 3/2016 | Ivanovski | |
| 9,360,991 B2 | 6/2016 | Celebisoy | |
| 9,378,588 B2 | 6/2016 | Song | |
| 9,390,082 B1 | 7/2016 | Stolte et al. | |
| 9,405,435 B2 | 8/2016 | Hendricks | |
| 9,437,038 B1 | 9/2016 | Costello | |
| 9,495,375 B2 | 11/2016 | Huang | |
| 9,584,402 B2 | 2/2017 | Christmas et al. | |
| 9,626,341 B1 | 4/2017 | Guan et al. | |
| 9,684,887 B2 | 6/2017 | Majeti et al. | |
| 9,811,810 B1* | 11/2017 | Ranganath | G06Q 20/405 |
| 9,886,229 B2 | 2/2018 | Christmas | |
| 10,075,502 B2 | 9/2018 | Malpass | |
| 10,084,688 B2 | 9/2018 | Christmas et al. | |
| 10,095,873 B2 | 10/2018 | Christmas et al. | |
| 10,123,153 B2 | 11/2018 | Christmas et al. | |
| 2001/0028369 A1 | 10/2001 | Gallo et al. | |
| 2001/0033654 A1 | 10/2001 | Wieser | |
| 2001/0044578 A1 | 11/2001 | Ben-Haim | |
| 2002/0085681 A1 | 7/2002 | Jensen | |
| 2002/0105529 A1 | 8/2002 | Bowser et al. | |
| 2002/0105551 A1 | 8/2002 | Kamen | |
| 2002/0138543 A1 | 9/2002 | Teng | |
| 2003/0074529 A1 | 4/2003 | Crohas | |
| 2003/0126272 A1 | 7/2003 | Cori et al. | |
| 2003/0126335 A1 | 7/2003 | Silvester | |
| 2003/0131050 A1 | 7/2003 | Vincent | |
| 2003/0142136 A1 | 7/2003 | Carter | |
| 2003/0217097 A1 | 11/2003 | Eitel | |
| 2004/0088280 A1 | 5/2004 | Koh et al. | |
| 2004/0104932 A1 | 6/2004 | Brebner | |
| 2004/0205091 A1 | 10/2004 | Mulcahy | |
| 2005/0005246 A1 | 1/2005 | Card | |
| 2005/0076216 A1 | 4/2005 | Nyberg | |
| 2005/0097008 A1 | 5/2005 | Ehring | |
| 2005/0165651 A1* | 7/2005 | Mohan | G06Q 20/0453 705/14.64 |
| 2005/0185364 A1 | 8/2005 | Bell | |
| 2005/0224589 A1 | 10/2005 | Park et al. | |
| 2005/0237704 A1 | 10/2005 | Ceresoli | |
| 2005/0271207 A1 | 12/2005 | Frey | |
| 2006/0020888 A1 | 1/2006 | Kang et al. | |
| 2006/0057960 A1 | 3/2006 | Tran | |
| 2006/0075225 A1 | 4/2006 | Flynn et al. | |
| 2006/0085741 A1 | 4/2006 | Weiner | |
| 2006/0090122 A1 | 4/2006 | Pyhalammi et al. | |
| 2006/0112270 A1 | 5/2006 | Erez | |
| 2006/0130004 A1 | 6/2006 | Hughes et al. | |
| 2006/0149825 A1 | 7/2006 | Kim | |
| 2006/0161631 A1 | 7/2006 | Lira | |
| 2006/0200518 A1 | 9/2006 | Sinclair et al. | |
| 2006/0239275 A1 | 10/2006 | Zlateff et al. | |
| 2006/0239375 A1 | 10/2006 | Kim et al. | |
| 2006/0294386 A1 | 12/2006 | Yuval et al. | |
| 2007/0050778 A1 | 3/2007 | Lee | |
| 2007/0120846 A1 | 5/2007 | Ok et al. | |
| 2007/0130541 A1 | 6/2007 | Louch | |
| 2007/0158408 A1 | 7/2007 | Wang et al. | |
| 2007/0160198 A1 | 7/2007 | Orsini et al. | |
| 2007/0168614 A1 | 7/2007 | Jianjun et al. | |
| 2007/0245048 A1 | 10/2007 | Mezet et al. | |
| 2007/0271580 A1 | 11/2007 | Tischer et al. | |
| 2007/0273675 A1 | 11/2007 | Wangler | |

(56) References Cited

U.S. PATENT DOCUMENTS

| | | |
|---|---|---|
| 2007/0279852 A1 | 12/2007 | Daniel et al. |
| 2007/0282601 A1 | 12/2007 | Li |
| 2008/0024976 A1 | 1/2008 | Hardson et al. |
| 2008/0069358 A1 | 3/2008 | Yang |
| 2008/0080709 A1 | 4/2008 | Mithtchenko et al. |
| 2008/0181141 A1 | 7/2008 | Krantz |
| 2008/0186305 A1 | 8/2008 | Carter |
| 2008/0222238 A1 | 9/2008 | Ivanov et al. |
| 2008/0223890 A1 | 9/2008 | Tecchiolli et al. |
| 2008/0235629 A1 | 9/2008 | Porter et al. |
| 2008/0241809 A1 | 10/2008 | Ashmore |
| 2008/0250179 A1 | 10/2008 | Moon |
| 2008/0305738 A1 | 12/2008 | Khedouri et al. |
| 2008/0313450 A1 | 12/2008 | Rosenberg |
| 2008/0317068 A1 | 12/2008 | Sagar |
| 2009/0009605 A1 | 1/2009 | Ortiz |
| 2009/0089692 A1 | 4/2009 | Morris |
| 2009/0116445 A1 | 5/2009 | Samar et al. |
| 2009/0144653 A1 | 6/2009 | Ubillos |
| 2009/0146775 A1 | 6/2009 | Bonnaud et al. |
| 2009/0239468 A1 | 9/2009 | He |
| 2009/0240598 A1 | 12/2009 | Kargman |
| 2009/0300025 A1 | 12/2009 | Rothschild et al. |
| 2010/0007768 A1 | 1/2010 | Yong et al. |
| 2010/0020035 A1 | 1/2010 | Ryu et al. |
| 2010/0050129 A1 | 2/2010 | Li et al. |
| 2010/0078343 A1 | 4/2010 | Hoellwarth |
| 2010/0088634 A1 | 4/2010 | Tsuruta |
| 2010/0093412 A1 | 4/2010 | Serra |
| 2010/0122207 A1 | 5/2010 | Kim et al. |
| 2010/0153449 A1 | 6/2010 | Baba et al. |
| 2010/0161743 A1 | 6/2010 | Krishnamurthi |
| 2010/0169639 A1 | 7/2010 | Jeffries |
| 2010/0169836 A1 | 7/2010 | Stallings |
| 2010/0225735 A1 | 9/2010 | Shaffer |
| 2010/0238089 A1 | 9/2010 | Massand |
| 2010/0256624 A1 | 10/2010 | Brannon |
| 2010/0268929 A1 | 10/2010 | Fumiyoshi |
| 2010/0281138 A1 | 11/2010 | Froimtchuk et al. |
| 2010/0309228 A1 | 12/2010 | Mattos et al. |
| 2010/0313154 A1 | 12/2010 | Choi et al. |
| 2010/0315225 A1 | 12/2010 | Harrison et al. |
| 2010/0315417 A1 | 12/2010 | Cho et al. |
| 2011/0051642 A1 | 3/2011 | Krishnaswamy |
| 2011/0063211 A1 | 3/2011 | Hoerl et al. |
| 2011/0090534 A1 | 4/2011 | Terao et al. |
| 2011/0107269 A1 | 5/2011 | Chin et al. |
| 2011/0113251 A1 | 5/2011 | Lu et al. |
| 2011/0131660 A1 | 6/2011 | Claessen et al. |
| 2011/0134110 A1 | 6/2011 | Song et al. |
| 2011/0138175 A1 | 6/2011 | Clark |
| 2011/0179368 A1 | 7/2011 | King et al. |
| 2011/0252098 A1 | 10/2011 | Kumar |
| 2011/0283208 A1 | 11/2011 | Gallo |
| 2011/0287808 A1 | 11/2011 | Huang |
| 2011/0294474 A1 | 12/2011 | Barany et al. |
| 2011/0295392 A1 | 12/2011 | Cunnington |
| 2011/0296339 A1 | 12/2011 | Kang |
| 2011/0310100 A1 | 12/2011 | Adimatyam et al. |
| 2012/0011200 A1 | 1/2012 | Zhang et al. |
| 2012/0034897 A1 | 2/2012 | Kreitzer |
| 2012/0047517 A1 | 2/2012 | Townsend et al. |
| 2012/0098754 A1 | 4/2012 | Kim |
| 2012/0128172 A1 | 5/2012 | Alden |
| 2012/0155510 A1 | 6/2012 | Hirsch et al. |
| 2012/0166953 A1 | 6/2012 | Affronti et al. |
| 2012/0194976 A1 | 8/2012 | Golko et al. |
| 2012/0200567 A1 | 8/2012 | Mandel |
| 2012/0209630 A1 | 8/2012 | Ihm et al. |
| 2012/0242845 A1 | 9/2012 | Tan |
| 2012/0260218 A1 | 10/2012 | Bawel |
| 2012/0267432 A1 | 10/2012 | Kuttuva |
| 2012/0282858 A1 | 11/2012 | Gill et al. |
| 2012/0293509 A1 | 11/2012 | Barnsley |
| 2013/0028419 A1 | 1/2013 | Das et al. |
| 2013/0050117 A1 | 2/2013 | Cho et al. |
| 2013/0073692 A1 | 3/2013 | Isaza |
| 2013/0077529 A1 | 3/2013 | Lueckenhoff et al. |
| 2013/0080541 A1 | 3/2013 | Herbert |
| 2013/0097239 A1 | 4/2013 | Brown et al. |
| 2013/0111038 A1 | 5/2013 | Girard |
| 2013/0125000 A1 | 5/2013 | Fleischhauer |
| 2013/0152113 A1 | 6/2013 | Conrad et al. |
| 2013/0159080 A1 | 6/2013 | Wu et al. |
| 2013/0159178 A1 | 6/2013 | Colon et al. |
| 2013/0163195 A1 | 6/2013 | Pelletier |
| 2013/0201176 A1 | 8/2013 | Lee |
| 2013/0205277 A1 | 8/2013 | Seven et al. |
| 2013/0212112 A1 | 8/2013 | Blom |
| 2013/0219479 A1 | 8/2013 | Desoto et al. |
| 2013/0227420 A1 | 8/2013 | Pasquero et al. |
| 2013/0235037 A1 | 9/2013 | Baldwin |
| 2013/0238711 A1 | 9/2013 | Lashkari et al. |
| 2013/0256403 A1 | 10/2013 | Mackinnon |
| 2013/0260819 A1 | 10/2013 | Suzuki et al. |
| 2013/0266065 A1 | 10/2013 | Paczkowski |
| 2013/0266129 A1 | 10/2013 | Pattan et al. |
| 2013/0268802 A1 | 10/2013 | Ito et al. |
| 2013/0272196 A1 | 10/2013 | Li |
| 2013/0273983 A1 | 10/2013 | Hsu |
| 2013/0290440 A1 | 10/2013 | Pratt et al. |
| 2013/0300740 A1 | 11/2013 | Snyder |
| 2013/0303160 A1 | 11/2013 | Fong |
| 2013/0317835 A1 | 11/2013 | Matthew |
| 2013/0346911 A1 | 12/2013 | Sripada |
| 2014/0006350 A1* | 1/2014 | Fukui ............... G06F 16/192 707/632 |
| 2014/0012913 A1 | 1/2014 | Varoglu et al. |
| 2014/0026204 A1 | 1/2014 | Buntinx et al. |
| 2014/0039804 A1 | 2/2014 | Park et al. |
| 2014/0040777 A1 | 2/2014 | Jones |
| 2014/0052522 A1* | 2/2014 | Irani ............... G06Q 30/0225 705/14.26 |
| 2014/0052618 A1* | 2/2014 | Drozd ............. G06Q 20/0453 705/39 |
| 2014/0055822 A1 | 2/2014 | Hannaway et al. |
| 2014/0078136 A1 | 3/2014 | Sohn |
| 2014/0082547 A1 | 3/2014 | Ding |
| 2014/0106677 A1 | 4/2014 | Altman |
| 2014/0123033 A1 | 5/2014 | Uhma et al. |
| 2014/0132594 A1 | 5/2014 | Gharpure |
| 2014/0132736 A1 | 5/2014 | Chang |
| 2014/0136429 A1 | 5/2014 | Psihos |
| 2014/0141713 A1 | 5/2014 | Shirinfar |
| 2014/0156725 A1 | 6/2014 | Mandyam |
| 2014/0189532 A1 | 7/2014 | Sivaraman et al. |
| 2014/0207657 A1 | 7/2014 | Gacs et al. |
| 2014/0218356 A1 | 8/2014 | Distler |
| 2014/0232817 A1 | 8/2014 | Jones |
| 2014/0258938 A1 | 9/2014 | Christmas |
| 2014/0337640 A1 | 11/2014 | Sharma |
| 2014/0351181 A1 | 11/2014 | Canoy et al. |
| 2014/0355761 A1 | 12/2014 | Kawamura et al. |
| 2015/0009531 A1 | 1/2015 | Kawaguchi |
| 2015/0012617 A1 | 1/2015 | Park et al. |
| 2015/0019628 A1 | 1/2015 | Li |
| 2015/0095777 A1 | 4/2015 | Lim |
| 2015/0101018 A1 | 4/2015 | Forte |
| 2015/0106837 A1 | 4/2015 | Li |
| 2015/0145889 A1 | 5/2015 | Hanai |
| 2015/0194833 A1 | 7/2015 | Fathollahi et al. |
| 2015/0271271 A1 | 9/2015 | Bullota |
| 2015/0271299 A1 | 9/2015 | Bullota |
| 2015/0279470 A1 | 10/2015 | Cerrelli et al. |
| 2015/0281439 A1 | 10/2015 | Dudai |
| 2015/0339867 A1 | 11/2015 | Amon |
| 2015/0367230 A1 | 12/2015 | Bradford |
| 2015/0382169 A1 | 12/2015 | Burba |
| 2016/0014574 A1 | 1/2016 | Christmas et al. |
| 2016/0037055 A1 | 2/2016 | Waddington |
| 2016/0100279 A1 | 4/2016 | Christmas et al. |
| 2016/0134941 A1 | 5/2016 | Selvaraj |
| 2016/0162244 A1 | 6/2016 | Christmas |
| 2016/0188468 A1 | 6/2016 | Rao |

(56) References Cited

U.S. PATENT DOCUMENTS

| | | |
|---|---|---|
| 2016/0226730 A1 | 8/2016 | Schumacher |
| 2016/0260319 A1 | 9/2016 | Jeffery |
| 2016/0269468 A1 | 9/2016 | Malpass |
| 2017/0160992 A1 | 6/2017 | Christmas |
| 2017/0371378 A1 | 12/2017 | Christmas |
| 2018/0146378 A1 | 5/2018 | Christmas |
| 2019/0007477 A1 | 1/2019 | Malpass |
| 2019/0020576 A1 | 1/2019 | Christmas et al. |
| 2019/0037381 A1 | 1/2019 | Christmas et al. |
| 2019/0123501 A1 | 4/2019 | Christmas |

FOREIGN PATENT DOCUMENTS

| | | |
|---|---|---|
| CN | 1881164 | 12/2006 |
| CN | 101388815 | 3/2009 |
| CN | 101401341 | 4/2009 |
| CN | 102376133 | 3/2012 |
| CN | 102591571 | 7/2012 |
| CN | 103077462 | 5/2013 |
| CN | 103546181 | 1/2014 |
| CN | 106797337 | 5/2018 |
| CN | 105706033 | 5/2019 |
| EP | 0800144 | 10/1997 |
| EP | 1168769 | 2/2002 |
| EP | 1761048 | 3/2007 |
| EP | 1806649 | 7/2007 |
| EP | 3022638 | 4/2018 |
| HK | 1242492 | 6/2018 |
| JP | 09-091155 | 4/1997 |
| JP | 2007049606 | 2/2007 |
| JP | 2010535351 | 11/2010 |
| JP | 2011134159 | 7/2011 |
| JP | 2011147136 | 7/2011 |
| JP | 2011248489 | 12/2011 |
| JP | 2013214801 | 10/2013 |
| JP | 6310477 | 4/2018 |
| JP | 2015514845 | 6/2018 |
| KR | 10-2004-0108122 | 12/2004 |
| KR | 10-2005-0098078 | 10/2005 |
| KR | 10-20090059672 | 6/2009 |
| KR | 10-20100056594 | 5/2010 |
| KR | 10-20120092487 | 8/2012 |
| KR | 10-2012-0059488 | 5/2013 |
| KR | 10-2017-0047866 | 5/2017 |
| RU | 2421800 | 6/2011 |
| TW | 201214150 | 4/2012 |
| TW | 201320681 | 5/2013 |
| TW | 201349811 | 12/2013 |
| TW | 629910 | 7/2018 |
| WO | 2000033545 | 6/2000 |
| WO | 2005050393 | 6/2005 |
| WO | 2006107324 | 10/2006 |
| WO | 2006125027 | 11/2006 |
| WO | 2007076494 | 7/2007 |
| WO | 2007103908 | 9/2007 |
| WO | 2008090902 | 7/2008 |
| WO | 2009016612 | 2/2009 |
| WO | 2010018551 | 8/2010 |
| WO | 2012087847 | 6/2012 |
| WO | 2014012486 | 1/2014 |
| WO | 2014016622 | 1/2014 |
| WO | 2014085502 | 6/2014 |
| WO | 2014138187 | 9/2014 |
| WO | 2014141235 | 9/2014 |
| WO | 2014151925 | 9/2014 |
| WO | 2015009944 | 1/2015 |
| WO | 2015048684 | 4/2015 |
| WO | 2015112506 | 7/2015 |
| WO | 2016007780 | 1/2016 |
| WO | 2016057091 | 4/2016 |
| WO | 2016145126 | 9/2016 |
| WO | 2017096245 | 6/2017 |
| WO | 2018098313 | 5/2018 |
| WO | 2018144833 | 8/2018 |
| WO | 2018232186 | 12/2018 |
| WO | 2019079628 | 4/2019 |

OTHER PUBLICATIONS

USPTO; Office Action dated Sep. 18, 2015 in U.S. Appl. No. 14/164,919.
USPTO; Office Action dated Apr. 5, 2016 in U.S. Appl. No. 14/500,363.
USPTO; Final Office Action dated Jun. 3, 2016 in U.S. Appl. No. 14/092,165.
USPTO; Final Office Action dated Apr. 26, 2016 in U.S. Appl. No. 14/164,919.
USPTO; Office Action dated Jun. 22, 2016 in U.S. Appl. No. 14/745,100.
USPTO; Office action dated Apr. 22, 2016 in U.S. Appl. No. 14/709,231.
USPTO; Notice of Allowance dated Aug. 16, 2016 in U.S. Appl. No. 14/092,165.
USPTO; Office Action dated Oct. 6, 2016 in U.S. Appl. No. 14/197,517.
USPTO; Final Office Action dated Oct. 26, 2016 in U.S. Appl. No. 14/500,363.
USPTO; Final Office Action dated Oct. 11, 2016 in U.S. Appl. No. 14/709,231.
USPTO; Notice of Allowance dated Oct. 14, 2016 in U.S. Appl. No. 14/164,919.
USPTO; Final Office Action dated Dec. 20, 2016 in U.S. Appl. No. 14/745,100.
USPTO; Office Action dated Nov. 25, 2016 in U.S. Appl. No. 14/795,210.
USPTO; Office Action dated Apr. 7, 2017 in U.S. Appl. No. 14/500,363.
USPTO; Office Action dated Apr. 14, 2017 in U.S. Appl. No. 14/905,639.
USPTO; Office Action dated Apr. 6, 2017 in U.S. Appl. No. 14/709,231.
USPTO; Office Action dated May 4, 2017 in U.S. Appl. No. 14/745,100.
USPTO; Final Office Action dated Jun. 30, 2017 in U.S. Appl. No. 14/197,517.
USPTO; Final Office Action dated Aug. 17, 2017 in U.S. Appl. No. 14/795,210.
USPTO; Notice of Allowance dated Oct. 11, 2017 in U.S. Appl. No. 14/905,639.
USPTO; Final Office Action dated Oct. 3, 2017 in U.S. Appl. No. 14/500,363.
USPTO; Final Office action dated Sep. 29, 2017 in U.S. Appl. No. 14/709,231.
USPTO; Office Action dated Oct. 25, 2017 in U.S. Appl. No. 15/435,884.
USPTO; Final Office Action dated Oct. 13, 2017 in U.S. Appl. No. 14/745,100.
USPTO; Notice of Allowance dated Nov. 29, 2017 in U.S. Appl. No. 14/905,639.
USPTO; Non-Final Office Action dated Dec. 12, 2017 in U.S. Appl. No. 15/367,961.
USPTO; Non-Final Office Action dated Jan. 8, 2018 in U.S. Appl. No. 15/065,713.
USPTO; Notice of Allowance dated Feb. 26, 2018 in U.S. Appl. No. 14/745,100.
USPTO; Non-Final Office Action dated Mar. 8, 2018 in U.S. Appl. No. 14/197,517.
USPTO; Notice of Allowance dated May 7, 2018 in U.S. Appl. No. 15/065,713.
USPTO; Notice of Allowance dated May 17, 2018 in U.S. Appl. No. 14/709,231.
USPTO; Non-Final Office Action dated May 18, 2018 in U.S. Appl. No. 15/644,556.
USPTO; Notice of Allowance dated May 22, 2018 in U.S. Appl. No. 15/435,884.

(56) References Cited

OTHER PUBLICATIONS

USPTO; Notice of Allowance dated May 29, 2018 in U.S. Appl. No. 15/065,713.
USPTO; Notice of Allowance dated Jun. 20, 2018 in U.S. Appl. No. 15/435,884.
USPTO; Non-Final Office Action dated Jun. 28, 2018 in U.S. Appl. No. 14/795,210.
USPTO; Notice of Allowance dated Jun. 29, 2018 in U.S. Appl. No. 15/065,713.
USPTO; Notice of Allowance dated Jul. 5, 2018 in U.S. Appl. No. 14/745,100.
USPTO; Notice of Allowance dated Jul. 10, 2018 in U.S. Appl. No. 14/709,231.
USPTO; Final Office Action dated Aug. 10, 2018 in U.S. Appl. No. 15/367,961.
USPTO; Notice of Allowance dated Sep. 28, 2018 in U.S. Appl. No. 15/644,556.
EP; Extended Search Report dated Sep. 17, 2015 in Application Serial No. 15740208.2.
Sweden; Office Action dated Nov. 18, 2015 in Application Serial No. 1551071-2.
EP; Supplemental Search Report dated Jun. 14, 2016 in Application Serial No. 13859205.0.
EP; Supplemental Search Report dated Oct. 20, 2016 in Application Serial No. 14760041.5.
EP; Extended Search Report dated Jan. 24, 2017 in Application Serial No. 14760041.5.
EP; Supplemental Search Report dated Mar. 2, 2017 in Application Serial No. 14826056.5.
EP; Extended Search Report dated Mar. 21, 2017 in Application Serial No. 14846886.1.
MX; Examination Report dated Feb. 24, 2017 in Application Serial No. 2015/006550.
MX; Examination Report dated Apr. 21, 2017 in Application Serial No. 2015/011314.
JP; Examination Report dated Jul. 28, 2017 in Application Serial No. 2015-545200.
CN; Examination Report dated Jul. 28, 2017 in Application Serial No. 20138007041.5X.
CN; 2nd Examination Report dated Apr. 18, 2018 in Application Serial No. 201380070415.X.
CN; Examination Report dated May 9, 2018 in Application Serial No. 201480023946.8.
MX; 2nd Examination Report dated Oct. 24, 2017 in Application Serial No. 2015/011314.
MX; 3rd Examination Report dated Jul. 2, 2018 in Application No. 2015/011314.
EP; Supplemental Search Report dated Sep. 15, 2017 in Application Serial No. 15740208.2.
MX; Office Action dated Jan. 23, 2018 in Application Serial No. MX/a/2016/003798.
TW; Office Action dated Jan. 24, 2018 in Application Serial No. 104102514.
TW; Notice of Allowance dated May 15, 2018 in Application Serial No. 104102514.
EP; Extended Search Report dated Apr. 9, 2018 in Application Serial No. 15848371.9.
EP; Supplementary Search Report dated Apr. 30, 2018 in Application Serial No. 15848371.9.
EP; Extended Search Report dated Apr. 24, 2018 in Application Serial No. 15819468.8.
JP; Office Action dated Aug. 2, 2017 in Application Serial No. 2015-545200.
JP; Notice of Allowance dated Mar. 17, 2018 in Application Serial No. 2015-545200.
JP; Office Action dated Feb. 2, 2018 in Application Serial No. 2016-549317.
AU; 1st Office Action dated Apr. 13, 2018 in Application Serial No. 2013352236.
PCT; International Search Report dated Jul. 4, 2014 in Application No. US2014/020624.
PCT; Written Opinion dated Jul. 4, 2014 in Application No. US2014/020624.
PCT; International Preliminary Report on Patentability dated Sep. 8, 2015 in Application No. US2014/020624.
PCT; International Search Report dated Nov. 13, 2014 in US2014/047054.
PCT; Written Opinion dated dated Nov. 13, 2014 in US2014/047054.
PCT; International Preliminary Report on Patentability dated Jan. 19, 2016 in US2014/047054.
PCT; International Search Report dated Jan. 6, 2015 in US2014/058126.
PCT; Written Opinion dated Jan. 6, 2015 in US2014/058126.
PCT; International Search Report dated Mar. 5, 2014 in US2013042089.
PCT; Written Opinion dated Mar. 5, 2015 in US2013/072089.
PCT; International Preliminary Report on Patentability dated Jun. 2, 2015 in US2013072089.
PCT; International Search Report dated Apr. 24, 2015 in US2015/012063.
PCT; Written Opinion dated Apr. 24, 2015 in US2015/012063.
PCT; International Search Report and Written Opinion dated Oct. 6, 2015 in US2015/036801.
PCT; International Search Report and Written Opinion dated Nov. 2, 2015 in US2015/039797.
PCT; International Preliminary Report on Patentability dated Apr. 14, 2016 in US2014/058126.
PCT; International Search Report and Written Opinion dated Jul. 11, 2016 in US2016/021627.
PCT; International Search Report and Written Opinion dated Mar. 20, 2017 in US/2016/064744.
PCT; International Search Report and Written Opinion dated Feb. 20, 2018 in US/2017/063061.
PCT; International Search Report and Written Opinion dated Aug. 9, 2018 in International Application PCT/US2018/016610.
Kim, Young-Gon, and Moon-Seog Jun. "A design of user authentication system using QR code identifying method." Computer Sciences and Convergence Information Technology (ICCIT), 6th International Conference on IEEE. Nov. 29-Dec. 1, 2011.
"Application Programming Interface" by David Orenstein, published Jan. 10, 2000 on Computerworld.com.
Gerd Kortuem et al., "Architectural Issues in Supporting Ad-hoc Collaboration with Wearable Computers," In: Proceedings of the Workshop on Software Engineering for Wearable and Pervasive Computing at the 22nd International Conference on Software Engineering, 2000.
3rd party observation dated Dec. 22, 2015 against Patent Application No. 1551071-2 in Sweden.
Revault Product Data Sheet dated Mar. 19, 2015.
Dusk Jockeys; Dust Jockeys Android Apps dated Mar. 7, 2012, pp. 1-5.
Sue White: "Wi-Fi and Bluetooth Coexistence," Electronic Component News, Mar. 2, 2012, pp. 1-7, XP05504386, Retrieved from Internet: URL: https://www.ecnmag.com/article/2012/03/wi-fi-andbluetooth-coexistence [retrieved on Sep. 6, 2017].
USPTO; Non-Final Office Action dated Feb. 6, 2019 in U.S. Appl. No. 15/644,556.
USPTO; Final Office Action dated Feb. 7, 2019 in U.S. Appl. No. 14/795,210.
USPTO; Non-Final Office Action dated Mar. 7, 2019 in U.S. Appl. No. 15/367,961.
USPTO; Advisory Action dated Mar. 12, 2019 in U.S. Appl. No. 14/197,517.
CN; 1st Office Action dated Nov. 26, 2018 in Application Serial No. 201480065117.6.
CN; Notice of Intent to Grant dated Feb. 11, 2019 in Application No. CN 201380070415.
EP; Notice of Intent to Grant dated Jan. 4, 2019 in Application No. EP14760041.5.
CN; Notice of Intent to Grant dated Jan. 30, 2019 in Application No. CN 201480023946.8.

(56) References Cited

OTHER PUBLICATIONS

EP; Examination Report dated Feb. 5, 2019 in Application No. EP 13859205.0.
JP; Notice of Allowance dated Dec. 30, 2018 in Application No. JP 2016-549317.
TW; Search Report dated Dec. 10, 2018 in Application No. TW 107119353.
TW; First Office Action dated Dec. 6, 2018 in Application No. TW 107119353.
EP; Examination Report dated Jan. 3, 2019 in Application No. EP 15848371.9.
PCT; International Search Report and Written Opinion dated Oct. 12, 2018 in International Application PCT/US2018/037643.
Rico Fabio et al., "A Testbed for Developing, Simulating and Experimenting Multipath Aggregation Algorithms," Proceedings of the 2014 IEEE Emerging Technology and Factory Automation (ETFA), IEEE, pp. 1-4, (Sep. 2014).
USPTO; Final Office Action dated Oct. 18, 2018 in U.S. Appl. No. 14/197,517.
CN; 1st Office Action dated Nov. 20, 2018 in Application Serial No. 201580016416.5.
EP; Extended Search Report and Supplementary Search Report dated Oct. 19, 2018 in Application Serial No. 16762464.2.
AU; 1st Office Action dated Oct. 24, 2018 in Application Serial No. 2015287705.
MX; 2nd Examination Report dated Oct. 4, 2018 in Application Serial No. MX/a/2016/003798.
CN; 3rd Examination Report dated Oct. 31, 2018 in Application Serial No. CN 201380070415.
EPO; Examination Report dated Nov. 8, 2018 in Application No. EP 15740208.2.
AU; Examination Report dated Dec. 19, 2018 in Application Serial No. AU 2014225864.
"Class Persistent Manager," https://web.archive.org/web/20131110042918/https://tomcat.apache.org/tomcat-4.1doc/catalina/docs/api/org/apache/catalina/session, 3 Pages, (Oct. 2018).
USPTO; Notice of Allowance dated May 21, 2019 in U.S. Appl. No. 15/644,556.
USPTO; Non-Final Office Action dated Jun. 14, 2019 in U.S. Appl. No. 14/197,517.
USPTO; Restriction Requirement dated Jun. 20, 2019 in U.S. Appl. No. 16/152,342.
USPTO; Non-Final Office Action dated Sep. 30, 2019 in U.S. Appl. No. 16/152,342.
USPTO; Notice of Allowance dated Aug. 28, 2019 in the U.S. Appl. No. 15/821,212.
USPTO; Restriction Requirement dated Jun. 11, 2019 in the U.S. Appl. No. 16/164,468.
AU; 2nd Examination Report Mar. 20, 2019 in Application No. AU 2014225864.
MX; 3rd Examination Report dated Mar. 21, 2019 in Application No. MX/a/2016/003798.
CA; Office Action dated Nov. 23, 2018 in Application No. CA 2892664.
CA; 2nd Office Action dated Feb. 14, 2019 in Application No. CA 2892664.
AU; Examination Report dated Feb. 8, 2019 in Application No. AU 2015328723.
RU; Examination Report dated Jan. 31, 2019 in Application No. RU 2017113541.
EP; Examination Report dated Apr. 18, 2019 in Application No. EP 15819468.8.
JP; Examination Report dated May 8, 2019 in Application No. 2017-518492.
MX; Examination Report dated Jun. 19, 2019 in Application No. MX/a/2017/004463.
MX; Examination Report dated May 27, 2019 in Application No. MX/a/2016/000616.
Sweden; Office Action dated Jul. 17, 2019 in Application No. 1551071-2.
CN; Second Office Action dated Apr. 29, 2019 in Application No. 201480065117.6.
CN; Third Office Action dated Aug. 8, 2019 in Application No. 201480065117.6.
PCT; International Search Report and Written Opinion dated Feb. 12, 2019 in International Application PCT/US2019/056562.
PCT; International Preliminary Report on Patentability dated Jan. 19, 2017 in the International Application No. PCT/US2015/039797.
PCT; International Preliminary Report on Patentability dated Aug. 15, 2019 in the International Application No. PCT/US2018/016610.
PCT; International Search Report and Written Opinion dated Mar. 22, 2019 in the International Application No. PCT/US2018/063468.
PCT; International Search Report and Written Opinion dated Aug. 9, 2019 in the International Application No. PCT/US2019/027993.

\* cited by examiner

PAPERLESS APPLICATION

CROSS-REFERENCE TO RELATED APPLICATIONS

This application is a continuation of U.S. patent application Ser. No. 14/709,231 entitled "Paperless Application" and filed on May 11, 2015 which is incorporated herein by reference in its entirety. The '231 application is a continuation-in-part of U.S. patent application Ser. No. 14/500,363 entitled "Paperless Application" and filed on Sep. 29, 2014 which is incorporated herein by reference in its entirety. The '363 application claims priority to U.S. Provisional Application Ser. No. 61/884,826 entitled "Paperless Application" and filed on Sep. 30, 2013 which is incorporated herein by reference in its entirety.

FIELD OF INVENTION

The present disclosure relates to systems, methods, and programs for processing and transmitting data between devices.

BACKGROUND

Conventional methods of transmitting information between and/or among various parties, for example from businesses to consumers, typically can require either hard copies of the information (e.g., a printed receipt) and/or may require that one of the parties manually enter information into another party's electronic system (e.g., having the customer manually type an email address) to transmit the data electronically.

Such systems, methods, and/or programs can suffer from systemic inefficiencies and risks, such as loss of time in entering in a party's information, loss of a printed receipt, increased marginal costs, loss of electronic data, subsequent downstream processing, and discouragement from using paperless communication.

SUMMARY

Systems, methods, and articles of manufacture for transmitting information between devices are disclosed. The method may comprise transmitting, by a receiving device, a digital storage location to a file management system. The receiving device may generate a key. In response to generating the key, the receiving device may transmit a call to the file management system to instruct a transmitting device to transmit a document to the digital storage location. In response to the transmitting device scanning the key, the transmitting device may be configured to transmit the document to the digital storage location. The receiving device may transmit a request to access the document to the file management system.

BRIEF DESCRIPTION OF THE DRAWINGS

A more complete understanding may be derived by referring to the detailed description and claims when considered in connection with the Figures, wherein like reference numbers refer to similar elements throughout the Figures, and:

DETAILED DESCRIPTION

Figure 1:
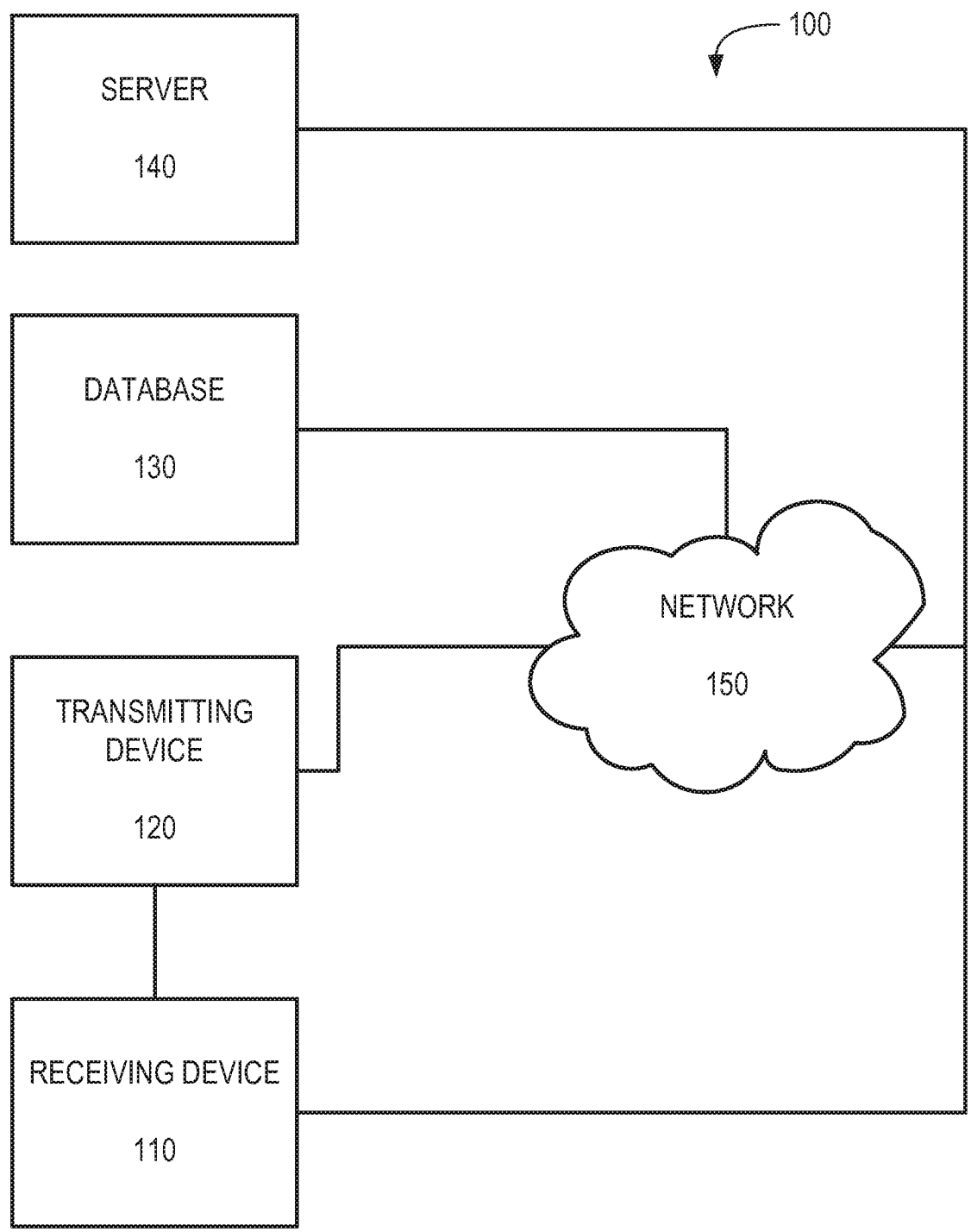
FIG. 1 illustrates, in accordance with various embodiments, a system for transmitting information between devices.

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Various systems, methods and computer program products are provided in this disclosure. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Systems, methods, and programs facilitating the electronic transfer of information are disclosed according to various embodiments.

In various embodiments, a user creates an account on a framework, such as a Graphical User Interface ("GUI") described below. The account may be connected to an application which the user may install on an electronic device. The account may contain the user's specific information such as contact information and can in some embodiments be linked with a key containing linking and access data with an account, folder, and/or personal identifier. Exemplary keys can include items such as a bar code or QR code which can be displayed, for example, on the user's electronic devices (e.g., a smartphone, tablet, or personal home computer) through any means and/or software that is functional with the created account and/or known identification systems (e.g., Radio Frequency Identification (RFID)) tags.

In some embodiments, when a transfer of information is desired (e.g., from a third party in the form of a receipt for goods sold or services performed), the user can present the key and an electronic device of the transmitting party can read the key which is linked to the account containing the user's specific information. The transmitting party, by reading the key, can grant the user's associated account access to the information. In some embodiments, when a plurality of keys are read, the electronic device of the transmitting party can be set to read a plurality of keys to allow a plurality of accounts access to the information.

The information may be presented in any form or medium, and in various embodiments, the content may be delivered electronically and/or be capable of being presented electronically. For example, in various embodiments the information may comprise, but is not limited to, a receipt, a website, a uniform resource locator ("URL"), a document (e.g., a MICROSOFT® Word document, a MICROSOFT® EXCEL™ document, an ADOBE® pdf document, etc.), an eBook, an emagazine, a receipt, an application or microapplication (as described below), a Short Message Service (SMS) or other type of text message, an email, social media sites including FACEBOOK®, FOURSQUARE®, TWITTER®, MYSPACE®, LINKEDIN®, and the like, and/or MMS, and combinations thereof. Additional forms of exemplary information include, but are not limited to, music (MP3, MP2, WV, etc.), videos (e.g., .mpeg, .mpg, .mov, etc.), pictures (e.g., a bitmap, jpeg, gif, png, etc.), slideshow presentations, and/or combinations thereof.

As used herein, "user" is not particularly limited and may include, for example, an individual, a plurality of individuals, a group of individuals, a business, an organization, and/or and another form of recognizable entity. Additionally, as used herein, "transmitting party" is not particularly limited and may include the user. For example, transmitting party may include a user sending information from one electronic device controlled and/or owned by the user to another electronic device controlled and/or owned by the user or, to another party.

For example, a college student wanting to send notes from his laptop to his smartphone can generate a key on the laptop, use the smartphone to scan the key from his laptop to his phone, and transfer the information from the laptop to the smartphone. As yet another example, one student could transfer notes from a college class stored on a server and/or network, such as a cloud, to another student by activating an electronic device, such as a smartphone. In this example, the student receiving the notes may generate a key, such as a barcode. The transferring student's electronic device may read the key and request the server and/or network to allow the account associated with the key to have access to the information. The server may make a copy in a designated account and/or folder assigned to the scanned key. The receiving student could then download the transmitted class notes to an authorized electronic device, such as the receiving student's smartphone or laptop.

Various embodiments can include one or more known keys which can in some embodiments act as an account and/or personal identifiers. This can in some embodiments be accomplished through registration of an account through a mobile device and/or through the Internet. In some embodiments, multiple keys can be associated with the same account and/or location and, in some embodiments, a single key or multiple keys can provide access to multiple accounts.

The accounts can be linked with various online programs and/or accounts, such as a social media site, a merchant website, an affiliate or partner websites, an external vendor, mobile device communications, and/or cloud computing. Examples of social media sites include Facebook®, Foursquare®, Twitter®, MySpace®, LinkedIn®, and the like. The accounts and/or personal identifiers can also be linked with electronic devices, such as a smartphone and/or tablet.

Examples of cloud computing include various types of systems and concepts of varying technology and paradigms. Exemplary models of cloud computing include infrastructure as a service (IaaS), platform as a service (PaaS), and/or software as a service (SaaS) models. The type of cloud is not particularly limited and can in various embodiments include public clouds, community clouds, hybrid clouds, distributed clouds. In some embodiments, the cloud can use various forms of cloud management strategies, such as user self-provisioning, advance provisioning, and/or dynamic provisioning management strategies. In various embodiments, the cloud management system is not limited and can use any currently available cloud management systems, such as systems available from HP®, Novell®, Eucalyptus®, OpenNebula®, and Citrix®.

In some embodiments, the keys can be any appropriate technology which would transmit sufficient data for the application to instruct the server and/or network to associate the correct destination for the data transfer. Exemplary keys can include a barcode, a matrix (2D) barcode (e.g. a QR code, Aztec code, High Capacity Color Barcode, and PDF417), an RFID chip, information obtained from any type of fingerprint reader, audio waves, iris recognition, stored cookies, and/or digital certificates, such as internet certificates for SSL (Secure Socket Layer) and S/MIME (Secure/Multipurpose Internet Mail Extensions). The form of the key is not particularly limited, for example, the barcode or QR code could be either printed or could be presented electronically on the screen of an electronic device. Keys can also be any form of known digital identification sent via wireless communication, such as Bluetooth, infrared, radio, and other known communication methods. In some embodiments, key can be a physical object, such a card with a magnetic strip, similar to a credit card or gift card. In other embodiments, the key can be completely electronic and can be associated with a person's electronic account, such as an Amazon® or PayPal® account.

For example, when purchasing items from an online retailer, such as Amazon®, a user could associate a key with their retail account. When purchases are made, the retailer, rather than sending an email copy confirming the purchase, may grant the user's associated account access to the information, and the information can be copied to a specified location.

In some embodiments, the access can be temporally limited (e.g., has an expiration date) and/or may have other permission restrictions by the transmitting party (e.g., read only). In some embodiments, keys can be remotely blocked by the user associated with the key and/or another party if compromised and/or for any other reason, which in some embodiments can render all previous shared content inaccessible.

After the transferring party obtains the information contained in the key, the transferring party can send the key to the server, which may grant the user access to the information to be transferred. The desired information can then be copied from the transferring party to the user.

The key can be read by any corresponding electrical device with the capability of reading the provided key. Key readers can include, for example, conventional point-of-sale systems (POS), digital cameras, smartphones, and RFID readers. For example, in some embodiments existing point-of sale systems, such as computerized barcode scanners at check-out counters can be used to read corresponding keys, such as barcodes or QR codes.

The key and reader systems can in some embodiments work together in an active system or can be passive systems. For example, the RFID key and reader system in some embodiments can be Passive Reader Active Tag (PRAT) systems, can in some embodiments be Active Reader Passive Tag (ARPT) systems, and can in some embodiments be Active Reader Active Tag (ARAT) systems. The frequency band of the signal is not particularly limited and can, for example, range anywhere from about 120 kHz to about 10 GHz. The readers can be fixed or can be mobile.

For example, by way of illustration, if a user were to purchase a product from a local vendor, the user could present an electronic mobile device, such as a smartphone. The user could activate the associated program and could then display an associated QR code linked with the user's account connected to the associated program. The vendor could then scan the displayed associated QR code with an existing scanner containing software compatible with the associated program.

The user's account could then be granted access to the receipt information (e.g., vendor identification, sales price, quantity, identification of item purchased, and method of payment such as an account linked with a specific credit card), which could then be transmitted electronically from the vendor's data storage to the user's account.

The user, in some embodiments, can then download the transmitted information onto the mobile electronic device and/or can download uploaded transmitted information from a cloud computing network.

In the case of downloading the transmitted information from a cloud computing network, the party desiring to transmit the information (e.g., the vendor) may transmit the information to the user from a vendor specific location on a cloud to the user's specific location on a cloud where the transmitted information may be stored. The transmitted information may also be compressed to minimize the time and/or data for the transmission. In various embodiments, the transmitted information may contain links to files or other data stored on the network, rather than the actual desired information themselves.

The downloaded information can then be categorized by a program and/or application associated with the user's specific account. The program and/or application can then send the information to the appropriately associated software (e.g., financial planning software, such as QuickBooks®).

Referring to FIG. 1, a system for transmitting information between devices is illustrated according to various embodiments. The system 100 may comprise a receiving device 110, a transmitting device 120, a database 130, and a server 140. In various embodiments, the database 130 and or the server 140 may be a part of a file management system. The file management system may be configured to store information uploaded from the transmitting device 120 and the receiving device 110. The file management system may control access to the information. The various components of system 100 may communicate via a network 150. However, in various embodiments, the various components of system 100 may communicated directly without communication over the network 150, such as via Bluetooth®, NFC, a wireless chip, visual communication, or any other suitable method of communication between the components of system 100. In various embodiments, the receiving device 110 may comprise a mobile electronic device, such as a smartphone.

Figure 2:
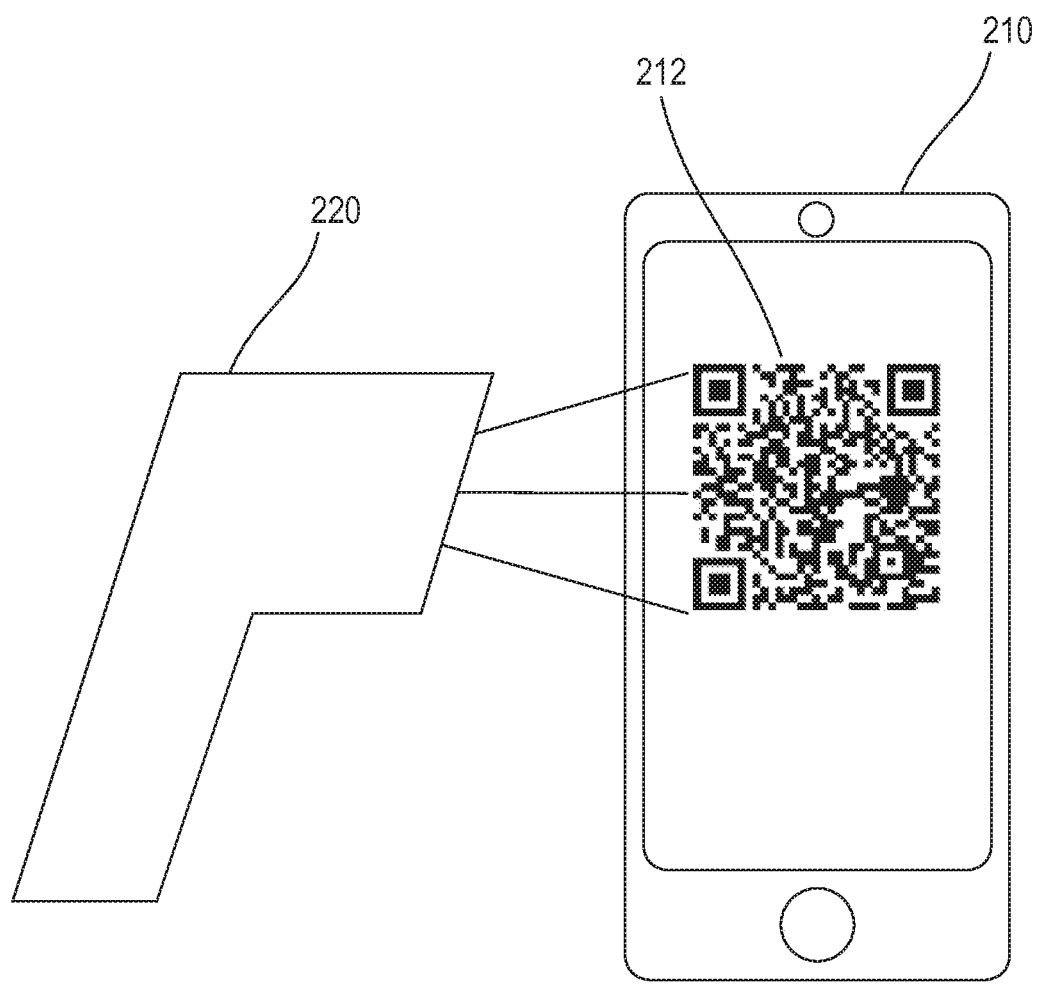
FIG. 2 illustrates a receiving device generating a key in accordance with various embodiments.

Referring to FIG. 2, a receiving device 210 generating a key 212 is illustrated according to various embodiments. The receiving device 210 may generate a key 212 by a variety of methods. For example, a user may physically shake the receiving device 210, causing the receiving device 210 to generate the key 212. The user may tap a button, initiate an application, speak a voice command, scan a fingerprint, or instruct the receiving device 210 to generate the key by any other suitable method.

The key 212 may comprise any symbol, signal, device, or other indicia capable of identifying information. For example, as illustrated in FIG. 2, the key 212 may comprise a QR code. In various embodiments, the key 212 may uniquely identify at least one of the receiving device 210, a user of the receiving device 210, an account of the user of the mobile electronic device, or a unique digital file location. In various embodiments, the key 212 may identify a location of a digital folder in which information should be received. For example, the key 212 may identify a location in a file management system which should receive information. In various embodiments, the file management system may be a cloud computing system.

A transmitting device 220 may be configured to scan the key 212. In various embodiments, the transmitting device 220 may comprise an optical device, such as a barcode scanner, which may optically scan the key 212. However, the transmitting device 220 may receive information from the key 212 by any suitable method, such as NFC, RFID, or WIFI.

Figure 3:
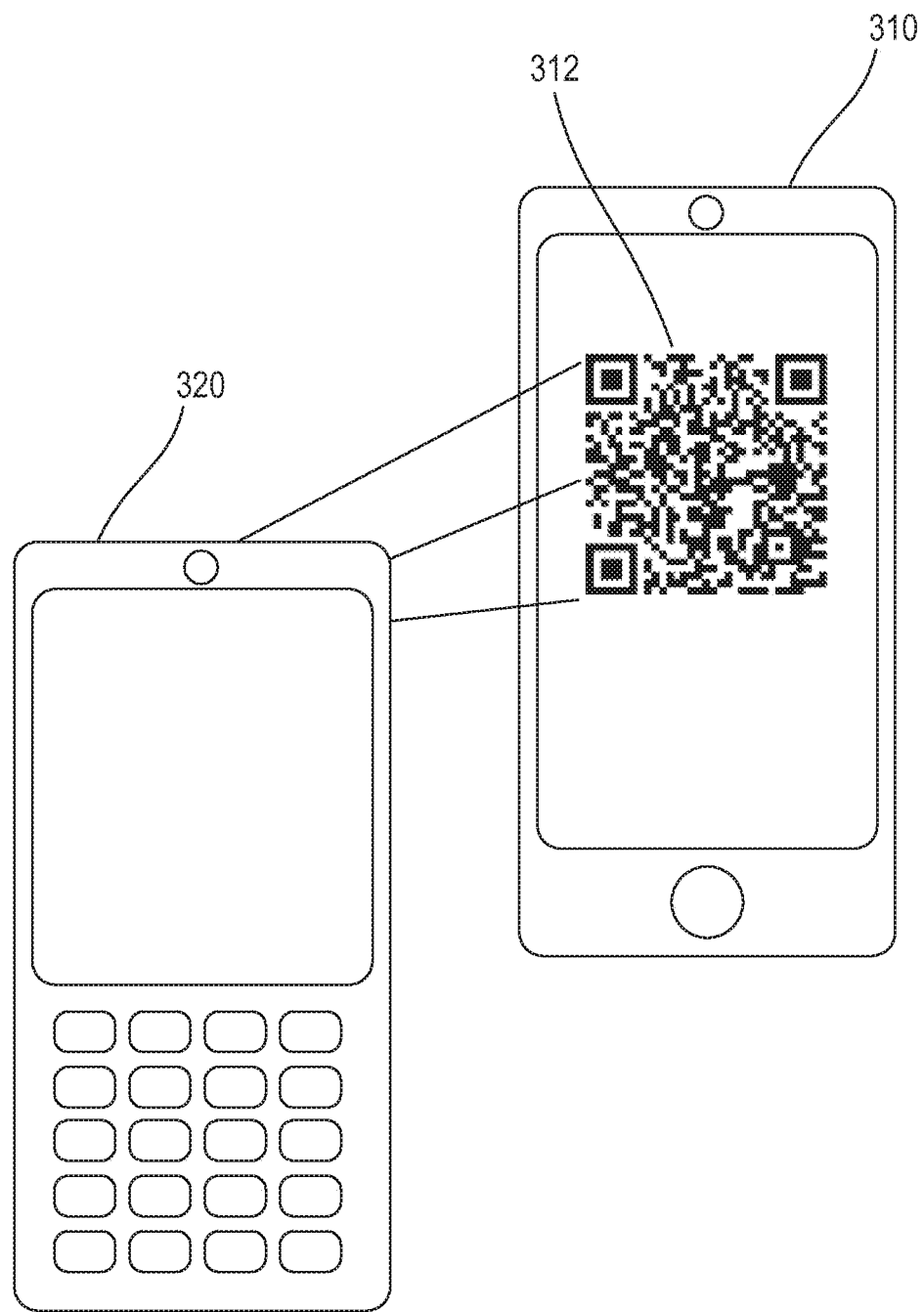
FIG. 3 illustrates a transmitting device scanning a receiving device in accordance with various embodiments.

Referring, to FIG. 3, a transmitting device 320 is illustrated scanning a receiving device 310 according to various embodiments. A receiving device 310 may generate a key 312. A transmitting device 320 may scan the key 312. In various embodiments, both the transmitting device 320 and the receiving device 310 may be mobile electronic devices, such as smartphones. In various embodiments, a user of the transmitting device may initiate an application in order to scan the key 312. In response to scanning the key 312, the transmitting device 320 may transmit desired information, such as a receipt, to an electronic account associated with the receiving device 310 and/or a user of the receiving device 310. In various embodiments, the transmitting device 320 may compress the information prior to transmitting the information. In various embodiments, the transmitting device 320 may transmit the information directly to the receiving device 310 without using a network. Examples of such transmission in Bluetooth® transmission. In another embodiment, a transport layer such as the Arch® transport layer available from Fasetto, LLC may be used. For more information regarding the Arch® transport layer, see U.S. patent application Ser. No. 14/164,919 entitled "SYSTEMS AND METHODS FOR PEER TO PEER COMMUNICATION," and filed on Jan. 27, 2014, the contents of which are incorporated by reference herein in their entirety.

Figure 4:
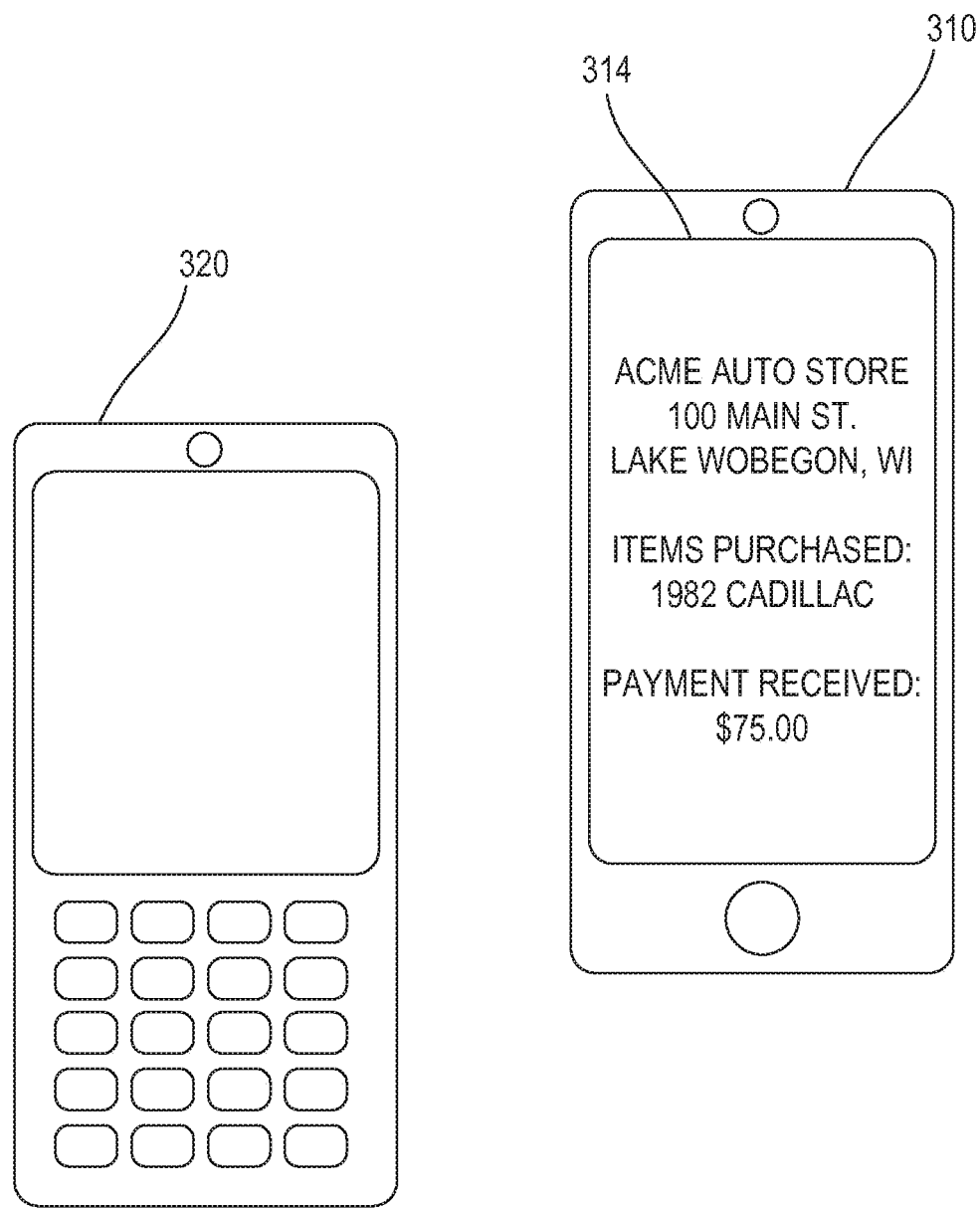
FIG. 4 illustrates a receiving device displaying received information in accordance with various embodiments.

Referring to FIG. 4, the receiving device 310 may download the compressed information sent to the electronic account associated with the receiving device 310 onto the receiving device 310. The receiving device 310 may decompress the compressed information and display the information transmitted in a graphical user interface on display screen 314. For example, the receiving device 310 may display a receipt for a purchase made from the user of the transmitting device 320.

Figure 5:
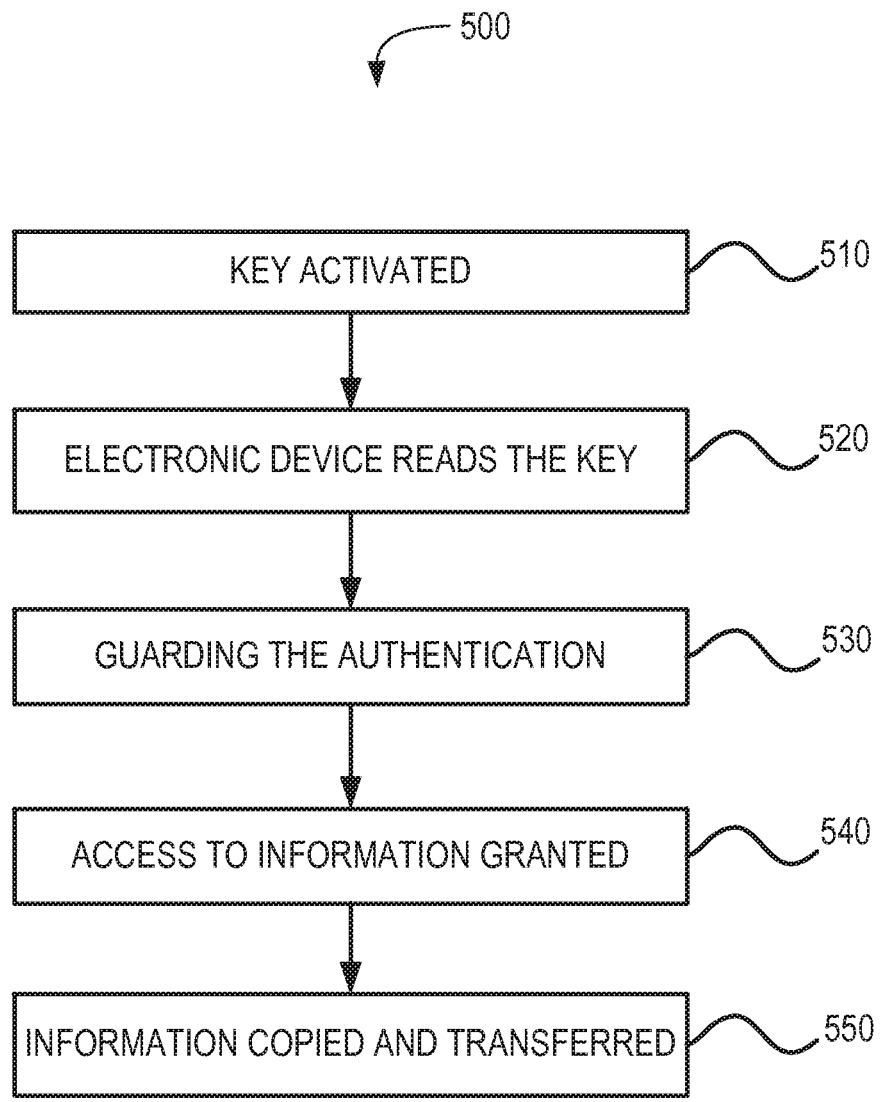
FIG. 5 illustrates an authorization process for electronically accessing information according to various embodiments.

Referring to FIG. 5, an authorization process for electronically accessing information is illustrated according to various embodiments. A key corresponding to an account or electronic folder is activated (step 510). A key may be activated in various ways depending on the type of key and is not particularly limited. For example, in some embodiments a key may be activated by shaking an electronic device, or in some embodiments may be activated in the form of swiping a card similar to a credit card containing a magnetic strip.

The account, folder, and/or personal identifier with which the key is associated are not particularly limited. In some embodiments, the user can designate and create accounts and/or folders to receive certain types of information. For example, the user may designate a first folder to receive fuel receipts and a second folder to receive restaurant receipts. In some embodiments, the key may identify the particular folder which should receive a receipt or other information. In some embodiments, folders can be default folders created by a program. In some embodiments, the key can be associated with several folders for storage and/or processing by a single or plurality of programs and/or applications. For example, a folder can be associated with the types of information transmitted (e.g., videos, music, documents, pictures, etc.).

An electronic device may read the key (step 520). The electronic device may comprise a point of sale device, a smartphone, an RFID reader, or any other suitable device capable of reading the key.

Then, the authentication is guarded (step 530). For example, in some embodiments, a random number can be generated and/or assigned to the specific information and/or user. This number, which can form part of the information contained in the key, can be stored, for example, on a server as a set of instructions in a database. Thus, the location of the information can, in some embodiments, avoid being disclosed and/or can provide additional security measures. For example, in some embodiments, when the key expires and/or is revoked, the server will inform a user trying to access the no longer authorized information that the key is no longer valid. Also, in some embodiments, the server can track usage based on the assigned random number contained in a key. For example, in some embodiments, (e.g., when the server is informed to grant access to the data referred to in the key), the server can track and/or monitor the use of the information (e.g., attempts access, times copied, identity of authorized users, time of access, location, times viewed, edits to information, and/or other information associated with a file or data history).

In some embodiments, such as embodiments which do not require being online, the authentication and guarding can be done via the transmitting party's device prior to transmission, for example a direct transfer method. Here, the transmitting party can be asked if they would like to send the file to the user requesting access to the information over a local area. In some embodiments, a random and/or one time use number can be included in the key. This can allow for the transmitting party to be able to ensure the identity of the user. For example, in some cases the transmitting party and the user are in close physical proximity and the transmitting party can physically be aware of to whom they are granting access.

The information can be stored on an electronic device (e.g., on a hard drive) or can in some embodiments, be stored on a network, on the internet, and/or in a cloud. In some embodiments, the account associated with the key can identify the associated account and gain access to the information be transferred, viewed, and/or copied.

In various embodiments, the location for the storage of the transferred information associated with the key can be set prior to activation, can be assigned at the moment of activation, and/or can be assigned after authorization is given. The location associated with the key can be manually or automatically assigned. For example, a program could automatically associate a folder within an assigned account based on the type of information being transmitted and/or could be associated based on the movement of an electronic device assigned to a specific account and/or folder.

For example, if gas were purchased from a vendor, access could be transmitted to a specific user account associated with a key and/or could go to a specific folder (e.g., an expense account for business) and/or could be automatically associated with a specific subfolder within a folder (e.g., a gas expense account). The key (e.g., a matrix (2D) code) could be read, for example, from an appropriate POS device (e.g., a conventional scanner) during checkout. The specific location can be manually assigned by the user or can automatically be assigned based on the type of information being transferred. For example, the vendor could automatically designate the information that it transmits based on its products and/or services. In some embodiments, this classification can be automatically be designated through existing classifications systems, such as standard industrial classification, such as North American Industry Classification System (NAICS).

In some embodiments, information, such as a receipt, can be accompanied by additional information provided by a transferring party. For example, a law firm providing a final draft of a contract could include in the transferred information both the contract as well as a bill for the legal services rendered. In some embodiments, the access granted need not be in a single location (e.g., in the same file on a server). Using the previous example, the bill for legal services could be kept in a different location than the final draft of the contract.

Furthermore, in some embodiments, when there is insufficient data from the transferring electronic device to properly associate the information with the correct destination within an account (e.g., when only a picture of a receipt is available), the information may be processed to determine the correct destination with an account using various known methods (e.g., optical character recognition (OCR) and/or intelligent character recognition (ICR)).

Additionally, in some embodiments, even when the information can be properly associated with the correct destination within an account, the information can be processed to facilitate use of the transferred information by a user and/or other programs and/or applications. For example, the information could be processed into a comma-separated values (CSV) file to facilitate use in consumer, business, and scientific programs and/or applications.

Access may be granted to the information (step 540). The receiving device may transmit a request to a file management system to access the information. In various embodiments, the user may enter login credentials, such as a user name and password in order to access the information. In various embodiments, the receiving device may provide the key or the random number generated as part of the key in order to access the information.

The information may be transferred and/or copied to an account and/or electronic device associated with the key (step 550). In some embodiments, the transfer of information can occur when the account associated with the key tells the server to send the information to the chosen account and/or associated folder.

For example, the scanning of the key could give the assigned account access to the information stored by the vendor (e.g., the customer's receipt). This could, in some embodiments, based on the information, default parameters, and/or parameters set by the user, be placed in a specific location (e.g., an expense account folder). Thus, it may be possible in some embodiments to avoid associated costs of printing and scanning receipts as well as downstream processing of the information.

Figure 6:
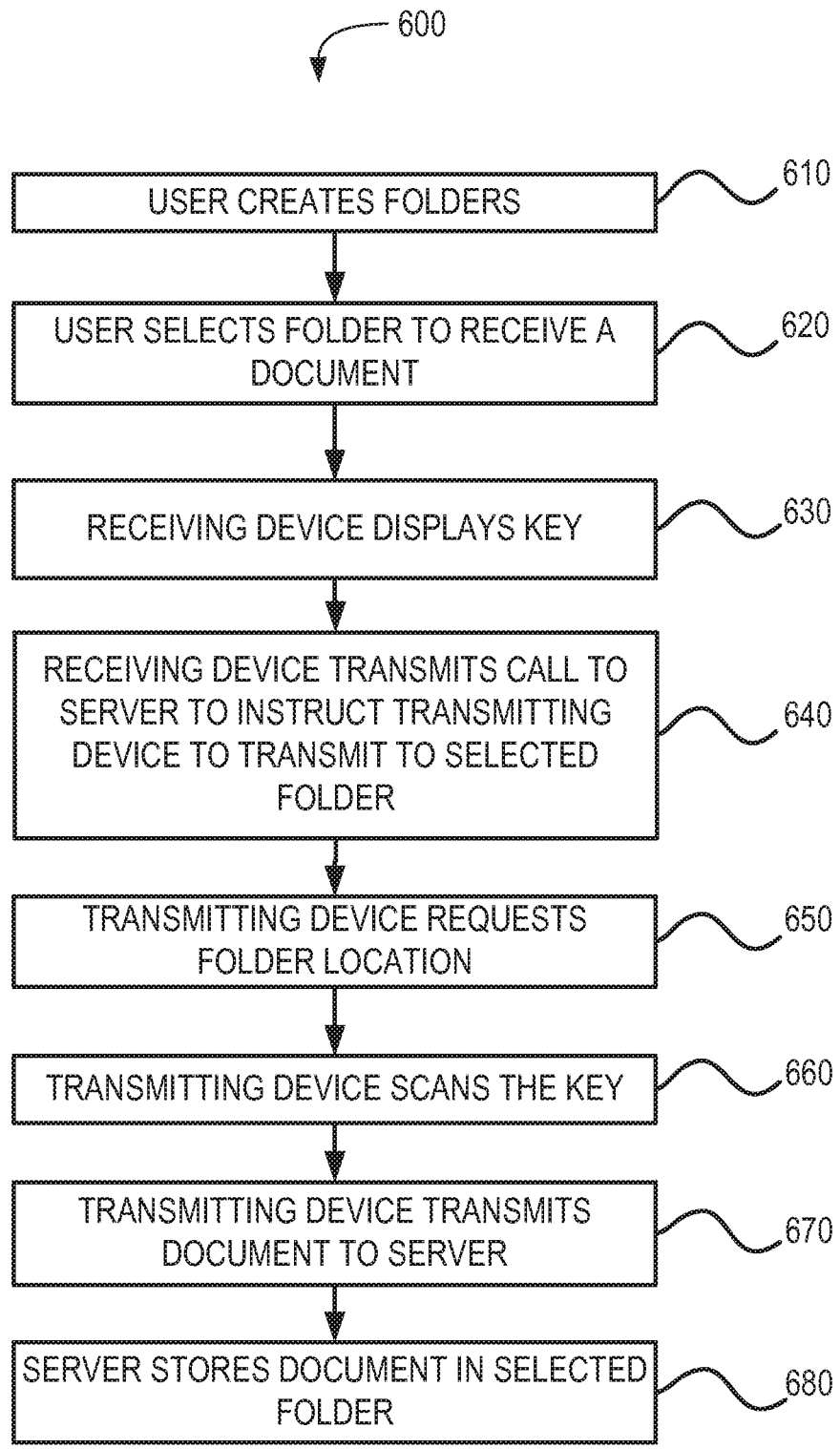
FIG. 6 illustrates a process for transmitting information to a storage location in accordance with various embodiments.

FIG. 6 illustrates a process 600 for transmitting information to a storage location according to various embodiments. A user may download a document storage application on a receiving device, such as a mobile device. A merchant or other user may download the document storage application on a transmitting device, such as a POS terminal or a mobile device. In various embodiments, the document storage application may be the same for the receiving device and the transmitting device. However, in various embodiments the document storage applications may be specifically configured to be used by either a transmitting device or a receiving device. The user and the merchant may register the receiving device and the transmitting device with the document storage application.

In various embodiments, the user may create folders for particular documents (step 610). For example, the user may designate a first folder for receipts and a second folder for photographs. However, in various embodiments the user may use default folders created by the document storage application. When the user wishes to receive a document, the user may open the document storage application on the receiving device and select a folder to receive the document (step 620). The user may select an option to display a key, such as a QR code, on the receiving device (step 630). In response to the receiving device displaying the key, the receiving device may transmit a call to a file management system to instruct the transmitting device to send the document to the selected folder (step 640). The transmitting device may display an option to print a document (e.g. a receipt) or send the document electronically using a key. In response to the transmitting device receiving a user selection to send the document using the key, the transmitting device may transmit a call to the file management system requesting for a location to send the document (step 650). The server may transmit information about the folder location to the transmitting device. Requesting the location may prompt the transmitting device to scan the key on the receiving device's screen. The transmitting device may scan the key on the receiving device (step 660). The transmitting device may then transmit the document to the file management system (step 670). The file management system may store the document in the selected folder (step 680). The user may then access the document on the server, as previously described herein.

Figure 7:
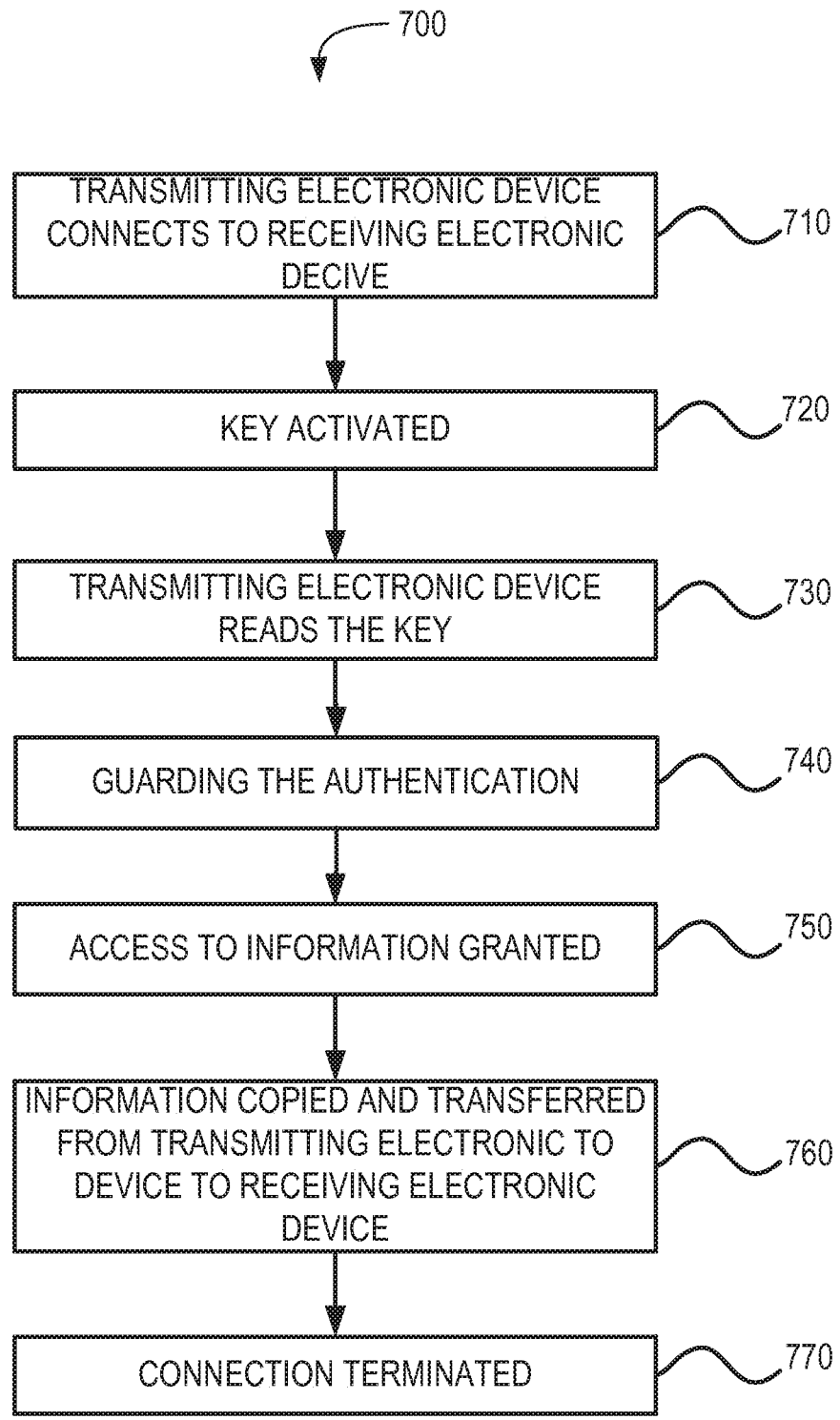
FIG. 7 illustrates a process for transmitting information without a network in accordance with various embodiments.

FIG. 7 illustrates a process 700 for the access and/or transfer of electronically stored data when a traditional public network, such as a digital mobile network, is not available. First, a transmitting device may connect to a receiving device (step 710). For example, the two devices can be connected via know communication methods, such as by creating WLAN or a hot spot with Bluetooth, Wi-Fi (e.g., 802.1x), NFC, audio, and/or visual transmissions or the Arch® transport layer as noted above. In some embodiments, the network need not be broadcasting (e.g., the WLAN may not be broadcasting an SSID). In some embodiments, the key can simultaneously provide the SSID as well as any other required information to connect to the WLAN (e.g., a password).

The key of the receiving device is activated (step 720). A key may be activated in various ways depending on the type of key and is not particularly limited throughout this disclosure and the various embodiments exemplified herein.

The transmitting electronic device reads the key (step 730). The authentication may be guarded (step 740) (e.g., by requesting confirmation from the transmitting party to allow the use of an associated randomly generated number to access the information). In some embodiments, the key can limit the number of times the information is accessed and/or the random number is used to help protect the information and/or connected electronic devices. For example, by guarding the authentication by confirming authorization from the transmitting party with a random generated one-time use number, the actual location of the information on the transmitting device can be prevented from being disclosed and repeated attempts by a user to access information on the transmitting device can be prevented. Thus, in some embodiments, the transmitting party can protect the information and can provide improved security between electronic devices. In some embodiments, the transmitting electronic device can track and/or monitor the use of the information (e.g., access, times copied, identity of authorized users, time of access, location, times viewed, edits to information, and/or other information associated with a file or data history).

Access to the information can then be granted (step 750), which in some embodiments is stored on the transmitting electronic device. As stated above, the access granted can, in some embodiments, be associated with a one-time use permit and/or can have other access limitations which can be modified by the transmitting party.

In some embodiments, the electronic information is copied and/or transferred from a transmitting electronic device to a receiving electronic device (step 760). In some embodiments, the receiving device is granted access to the information and then that information is transferred and/or copied by the receiving electronic device into a specific location. The methods of transferring information can be any of the forms of communication with electronic devices disclosed herein.

Thereafter, the connection between the at least two electronic devices can be, in some embodiments, terminated (step 770).

Some embodiments of the present disclosure relate to systems, methods, and programs of processing and transmitting information capable of interacting in conjunction with graphical user interfaces ("GUI"), and more particularly cubic GUIs. For example, the information being transmitted may be a three-dimensional representation of a plurality of files, or the information being transmitted may be stored on a face of a cubic file. For more information regarding cubic GUIs and three dimensional files, see U.S. patent application Ser. No. 14/197,517 entitled "SYSTEM AND METHOD FOR CUBIC GRAPHICAL INTERFACES," and filed on Mar. 5, 2014, the contents of which are incorporated by reference herein in their entirety.

The various parties discussed herein may communicate with the network 150 via a web client. A web client may include any device (e.g., personal computer) which communicates via any network, for example such as those discussed herein. A web client may include browser applications comprising internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADs®, IMACs®, and MACBOOKs®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE CHROME™, APPLE® SAFARI®, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client may include but is not limited to an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include but is not limited to any suitable personal computer, network computer, workstation, personal digital assistant, cellular phone, smartphone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

A network may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®, cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, a uniform resource locator ("URL"), a document (e.g., a MICROSOFT® Word document, a MICROSOFT® EXCEL™ document, an ADOBE® pdf document, etc), an "eBook," an "emagazine," an application or microapplication (as described below), an SMS or other type of text message, an email, social media (e.g., FACEBOOK®, FOURSQUARE®, TWITTER®, MYSPACE®, LINKEDIN®, and the like), MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, Windows 95/98/2000, Windows XP, Windows Vista, Windows 7, OS2, UNIX, Linux, Solaris, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA SYSTEM WEB SERVER).

In various embodiments, components, modules, and/or engines of system 700 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), MICROSOFT ACCESS™ or MICROSOFT® SQL SERVER® by Microsoft Corporation (Redmond, Wash.), MYSQL® by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with various embodiments, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in various embodiments, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in various embodiments, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of ACS to further enhance security.

The computers discussed herein may provide a suitable website or other Internet-based graphical user interface which is accessible by users. In various embodiments, the Microsoft Internet Information Server (IIS), Microsoft Transaction Server (MTS), and MICROSOFT® SQL SERVER®, are used in conjunction with the MICROSOFT® operating system, WINDOWS NT® web server software, a MICROSOFT® SQL SERVER® database system, and a MICROSOFT® Commerce Server. Additionally, components such as ACCESS® software or SQL SERVER®, ORACLE®, SYBASE® software, INFORMIX® software, MYSQL® software, INTERBASE® software, etc., may be used to provide an Active Data Object (ADO) compliant database management system. In various embodiments, the APACHE® web server is used in conjunction with a LINUX® operating system, a MYSQL® database, and the PERL®, PHP, and/or PYTHON® programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "less than 10" includes any and all subranges between (and including) the minimum value of zero and the maximum value of 10, that is, any and all subranges having a minimum value of equal to or greater than zero and a maximum value of equal to or less than 10, e.g., 1 to 5.

Then, in various embodiments, the user's account can then classify the transmitted information, associate the information received with additional user selected specific program, send the information to the user's selected program, and/or store the transmitted information into a specific user selected storage folder.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
   creating, by a consumer device, a digital folder based on an expense classification in a file management system;
   generating, by the consumer device, a key for a transaction, wherein the key comprises a randomly generated number associated on a one-to-one basis with the digital folder;
   displaying, by the consumer device, the key on a screen of the consumer device;
   transmitting, by the consumer device, the key for a transaction to a receiving device;
   transmitting, by the consumer device, the randomly generated number to the file management system; and
   instructing, by the consumer device and via the file management system, a merchant device to transmit a receipt to the digital folder;
   wherein the merchant device scans the key displayed on the consumer device; and
   wherein, in response to the merchant device scanning the key, the merchant device is configured to transmit the receipt to the digital folder based on an expense classification of the receipt matching the expense classification of the digital folder.

2. The method of claim 1, wherein the key comprises at least one of a matrix barcode or a barcode.

3. The method of claim 1, further comprising transmitting, by the consumer device, a request to access the receipt to the file management system.

4. The method of claim 3, wherein the request to access the receipt includes the randomly generated number.

5. The method of claim 1, further comprising displaying, by the consumer device, the receipt on a screen of the consumer device.

6. The method of claim 1, wherein the file management system comprises a cloud computing system.

7. A system comprising:
   a processor in a consumer device,
   a tangible, non-transitory memory configured to communicate with the processor,
   the tangible, non-transitory memory having instructions stored thereon that, in response to execution by the processor, cause the processor to perform operations comprising:
   creating, by the consumer device, a digital folder based on an expense classification in a file management system;
   generating, by the consumer device, a key for a transaction, wherein the key comprises a randomly generated number associated on a one-to-one basis with the digital folder;
   displaying, by the consumer device, the key on a screen of the consumer device;
   transmitting, by the consumer device, the key for a transaction to a receiving device;
   transmitting, by the consumer device, the randomly generated number to the file management system; and
   instructing, by the consumer device and via the file management system, a merchant device to transmit a receipt to the digital folder;
   wherein the merchant device scans the key displayed on the consumer device; and
   wherein, in response to the merchant device scanning the key, the merchant device is configured to transmit the receipt to the digital folder based on an expense classification of the receipt matching the expense classification of the digital folder.

8. The system of claim 7, wherein the key comprises at least one of a matrix barcode or a barcode.

9. The system of claim 7, the operations further comprising transmitting, by the consumer device, a request to access the receipt to the file management system.

10. The system of claim 9, wherein the request includes the randomly generated number.

11. The system of claim 7, the operations further comprising displaying, by the consumer device, the receipt on a screen of the consumer device.

12. The system of claim 7, wherein the file management system comprises a cloud computing system.

13. An article of manufacture including a non-transitory, tangible computer readable storage medium having instructions stored thereon that, in response to execution by a consumer device, cause the consumer device to perform operations comprising:

creating, by the consumer device, a digital folder based on an expense classification in a file management system;

generating, by the consumer device, a key for a transaction, wherein the key comprises a randomly generated number associated on a one-to-one basis with the digital folder;

displaying, by the consumer device, the key on a screen of the consumer device;

transmitting, by the consumer device, the key for a transaction to a receiving device;

transmitting, by the consumer device, the randomly generated number to the file management system; and instructing, by the consumer device and via the file management system, a merchant device to transmit a receipt to the digital folder;

wherein the merchant device scans the key displayed on the consumer device; and wherein, in response to the merchant device scanning the key, the merchant device is configured to transmit the receipt to the digital folder based on an expense classification of the receipt matching the expense classification of the digital folder.

14. The article of manufacture of claim 13, wherein the key comprises at least one of a matrix barcode or a barcode.

15. The article of manufacture of claim 13, the operations further comprising transmitting, by the consumer device, a request to access the receipt to the file management system.

16. The article of manufacture of claim 15, wherein the request includes the randomly generated number.

17. The article of manufacture of claim 13, the operations further comprising displaying, by the consumer device, the receipt on a screen of the consumer device.

18. The article of manufacture of claim 13, wherein the file management system comprises a cloud computing system.

* * * * *